United States Patent
Hamilton

(10) Patent No.: US 7,349,995 B2
(45) Date of Patent: Mar. 25, 2008

(54) COMPUTING DEVICE WITH SCALABLE LOGIC BLOCK TO RESPOND TO DATA TRANSFER REQUESTS

(75) Inventor: Tony G. Hamilton, Durham, NC (US)

(73) Assignee: Intel Corporation, Santa Clara, CA (US)

(*) Notice: Subject to any disclaimer, the term of this patent is extended or adjusted under 35 U.S.C. 154(b) by 81 days.

(21) Appl. No.: 10/093,662

(22) Filed: Mar. 7, 2002

(65) Prior Publication Data

US 2003/0188052 A1    Oct. 2, 2003

(51) Int. Cl.
G06F 15/16 (2006.01)

(52) U.S. Cl. .................. 709/250; 710/240; 709/219; 709/203

(58) Field of Classification Search ............. 710/356, 710/358, 110, 240–244, 22, 29, 31, 33–35, 710/306–308, 229; 709/201–203, 224, 217–219, 709/258, 250, 311, 328, 238, 200, 100–108, 709/226–229; 713/300, 324–340; 703/201–203, 703/224, 219

See application file for complete search history.

(56) References Cited

U.S. PATENT DOCUMENTS

| | | | |
|---|---|---|---|
| 5,437,032 A * | 7/1995 | Wolf et al. ............... | 718/103 |
| 5,548,724 A * | 8/1996 | Akizawa et al. .......... | 709/203 |
| 5,737,615 A * | 4/1998 | Tetrick ..................... | 713/324 |
| 5,774,668 A | 6/1998 | Choquier et al. | |
| 5,938,732 A * | 8/1999 | Lim et al. ................ | 709/229 |
| 6,173,409 B1 * | 1/2001 | Watts et al. .............. | 713/322 |
| 6,223,205 B1 * | 4/2001 | Harchol-Balter et al. ... | 709/105 |
| 6,263,368 B1 * | 7/2001 | Martin .................... | 709/224 |
| 6,453,344 B1 * | 9/2002 | Ellsworth et al. ......... | 709/220 |
| 6,625,740 B1 * | 9/2003 | Datar et al. .............. | 713/324 |
| 6,640,239 B1 * | 10/2003 | Gidwani .................. | 709/203 |
| 6,725,317 B1 * | 4/2004 | Bouchier et al. .......... | 710/312 |
| 6,845,445 B2 * | 1/2005 | Marchand et al. ......... | 713/100 |
| 6,853,638 B2 * | 2/2005 | Cohen .................... | 370/389 |
| 6,859,882 B2 * | 2/2005 | Fung ...................... | 713/300 |
| 6,895,520 B1 * | 5/2005 | Altmejd et al. ........... | 713/324 |
| 6,901,522 B2 * | 5/2005 | Buch ...................... | 713/320 |
| 7,260,640 B1 * | 8/2007 | Kramer et al. ............ | 709/231 |
| 7,263,624 B2 * | 8/2007 | Marchand et al. ......... | 713/324 |
| 2001/0054124 A1 * | 12/2001 | Tsuruta et al. ............ | 710/100 |
| 2002/0007464 A1 | 1/2002 | Fung | |
| 2003/0033428 A1 * | 2/2003 | Yadav .................... | 709/238 |
| 2003/0115495 A1 * | 6/2003 | Rawson ................... | 713/324 |

FOREIGN PATENT DOCUMENTS

EP    1180886    * 2/2002

OTHER PUBLICATIONS

Almquist, P., "Type of service in the internet protocol suite", *Network Working Group Request for Comments*, pp. 1-25, Jul. 1992 (XP002909776).

Qu, Gang, et al., "Power minimization using system-level partitioning of applications with quality of service requirements", *IEEE/ACM International Conference in San Jose*, CA, pp. 343-346, 1999.

* cited by examiner

*Primary Examiner*—Raymond N Phan
(74) *Attorney, Agent, or Firm*—Fish & Richardson P.C.

(57) ABSTRACT

An apparatus a first processor which receives a data transfer request and generates a service command that corresponds to a scalable logic block required to respond to the data transfer request, and a server computer that receives the service command and scales the scalable logic block in accordance with the service command.

37 Claims, 3 Drawing Sheets

COMPUTING DEVICE WITH SCALABLE LOGIC BLOCK TO RESPOND TO DATA TRANSFER REQUESTS

TECHNICAL FIELD

This application relates to a computer having scalable logic blocks.

BACKGROUND

Public networks, such as the Internet, allow users to access resources of interconnected computers, and also offer the possibility of access to the resources of smaller, private networks (intranets). Intranets typically include systems that route data traffic from the Internet to and from the network resources of the intranet. The data traffic carried on a network 10 (as shown in FIG. 1) may include several different types of data services (classes of service), for example the data traffic may include voice data (to implement Voice-Over-IP (VOIP)), video data (to implement streaming video), and encrypted data.

Each class of data service is characterized by having different requirements for bandwidth and response times to provide response times considered adequate to a user of network 10. Also, many classes of service are implemented by packetizing the data, where the resulting data packets are transmitted over the network, between two devices. A network processor (a router) may be used to regulate the flow of packet traffic, including VOIP packets, streaming video packets, and encrypted packets on the network. For example, a router may be used to redirect packet traffic in order to reduce congestion on the network or to re-prioritize the data packets.

DESCRIPTION

Figure 1:
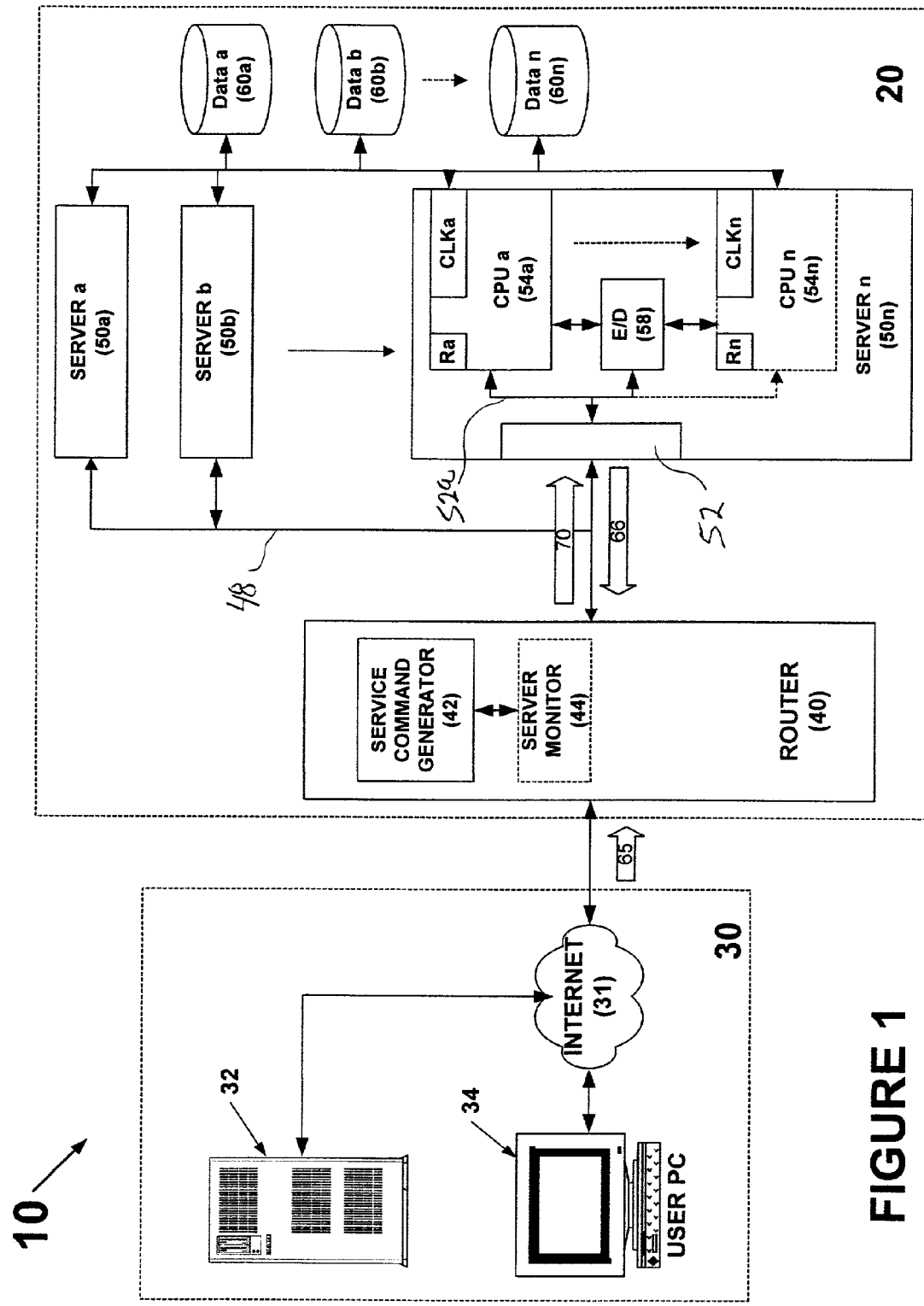
FIG. 1 is a block diagram of a network that includes data storage devices and server computers.

Referring to FIG. 1, a computer network 10 includes a private network 20 and a public network 30. Private network 20 includes server computers 50a-50n that are connected to data devices 60a-60n, and a router 40 connected by a shared data bus 48 to server computers 50a-50n. Router 40 (a "network interface computer") is also connected to transfer data requests and data between private network 20 and a public network 30. In this example, public network 30 includes Internet 31 connected to an external server computer 32 and an external user computer 34.

Servers 50a-50n are all connected to a common set of data devices 50a-50n. Router 40 may perform load balancing, i.e., routing multiple data requests to different servers 50a-50n, so that many data transfers are processed simultaneously by servers 50a-50n.

Typically, each server 50a-50n in a network, such as network 20, is configured to process many classes of data traffic, for example, each server 50a-50n may include an encryption/decryption logic block for processing a data transfer of encrypted data. However, when processing a class of data service that does not require data encryption, the encryption/decryption logic block will remain "on", consuming power and generating heat.

In an embodiment, server 50n includes scalable logic blocks 54a-54n and 58, that may be scaled up or down in performance (or turned off). Scalable logic refers to a logic block that may be increased or decreased in speed or performance, such as a clock speed of a CPU clock, CLKa-CLKn included in CPUa-CPUn, respectively, or, may refer to a logic block that may be turned on or off, such as encryption logic block 58. In more detail, when not needed to process a data transfer, a scalable logic block may be scaled down to conserve power and reduce the generation of heat. Conversely, when needed, a scalable logic block may be scaled up to provide faster response time or provide a specific functionality required by a specific class of data service, as will be explained.

Data traffic carried on network 10 may include several different classes of data services, for example the data traffic may include a voice data service (to implement Voice-Over-IP (VOIP)), a video data service (to implement streaming video), and an encrypted data service. Each class of data service is characterized by having different requirements for bandwidth and response times to provide response times considered adequate to a user of network 10. In some cases, an advanced informational signal (or packet) is sent before the data transfer request. The advance signal indicates the class of data service transfer that will be required by the data transfer, and is sent so that a data channel can be allocated for the subsequent data transfer. In network 10, router 40 may monitor these advanced informational signals to allocate a specific server for an anticipated data transfer. Furthermore, router 40 may use the advanced signals to determine which scalable logic block of a selected server should be scaled up or down to prepare for the anticipated data transfer.

During operation of network 10, a data request 65 is sent from one of the external computers 32 or 34, through public network 30 to router 40. If data request 65 is addressed to data stored on one of the data devices 60a-60n, router 40 forwards data request 65 over shared bus 48 to one of the server computers 50a-50n, for example, server 50n. In response to the received data request 65, server 50n transfers the requested data 66 from the appropriate data device 60a-60n, over shared bus 48 to router 40. Router 40 then routes the received data 66 to the requesting computer 32 or 24 on public network 30.

Still referring to FIG. 1, router 40 includes a service command generator 42 that determines from a received data request 65 (or from an advance informational signal) if a scalable logic block included in a particular server should be scaled up or down in performance to process the data request 65. If command generator 42 determines a scalable logic block in a selected server should be scaled, command generator 42 sends a service command 70 over shared bus 48 to a server (in this case, server 50n is selected) to cause server 50n to scale the specified logic block. Server 50n includes a service command interface logic block 52 that is connected to scalable logic blocks 54a-54n and 58 by server internal bus 52a. Command interface 52 interprets a received service command 70 from router 40 and causes the specified scalable logic blocks of server 50n to be scaled appropriately based on the received service command 70.

In an embodiment, service command 70 specifies a value and causes that value to be stored in a register Ra-Rn, included in CPU 54a-54n, respectively. The stored value in register Ra-Rn is used by CPU 54a-54n, respectively, to determine the clock speed of CPU clocks CLKa-CLKn included in CPU 54a-54n, respectively.

In an embodiment, the clock speed of a CPU 54a-54n is determined based on a ratio of the stored value in register Ra-Rn to the operational speed of server internal bus 52a. For example, a service command 70 specifies a value of 1.8 to be stored in register Ra of CPU 54a. Assuming server internal bus 52a is operating at a speed of 500 MHZ, stored value of 1.8 would cause a scaling of CLKa to 900 MHZ (1.8 times 500 MHZ). As a further example, a service command that specified a value of 2.2, would cause the scaling of the CPU clock speed to 1.1 GHZ (2.2 times 500 MHZ).

Depending on the configuration of CPU 54a-54n, some CPU operations may need to be halted when the CPU clock speed is being scaled. Also, other operational conditions of the CPU may need to be changed when the CPU clock is scaled, for example, the operational voltage of a section of CPU 54a-54n may need to be scaled to allow for a scaled clock speed.

Figure 2A:
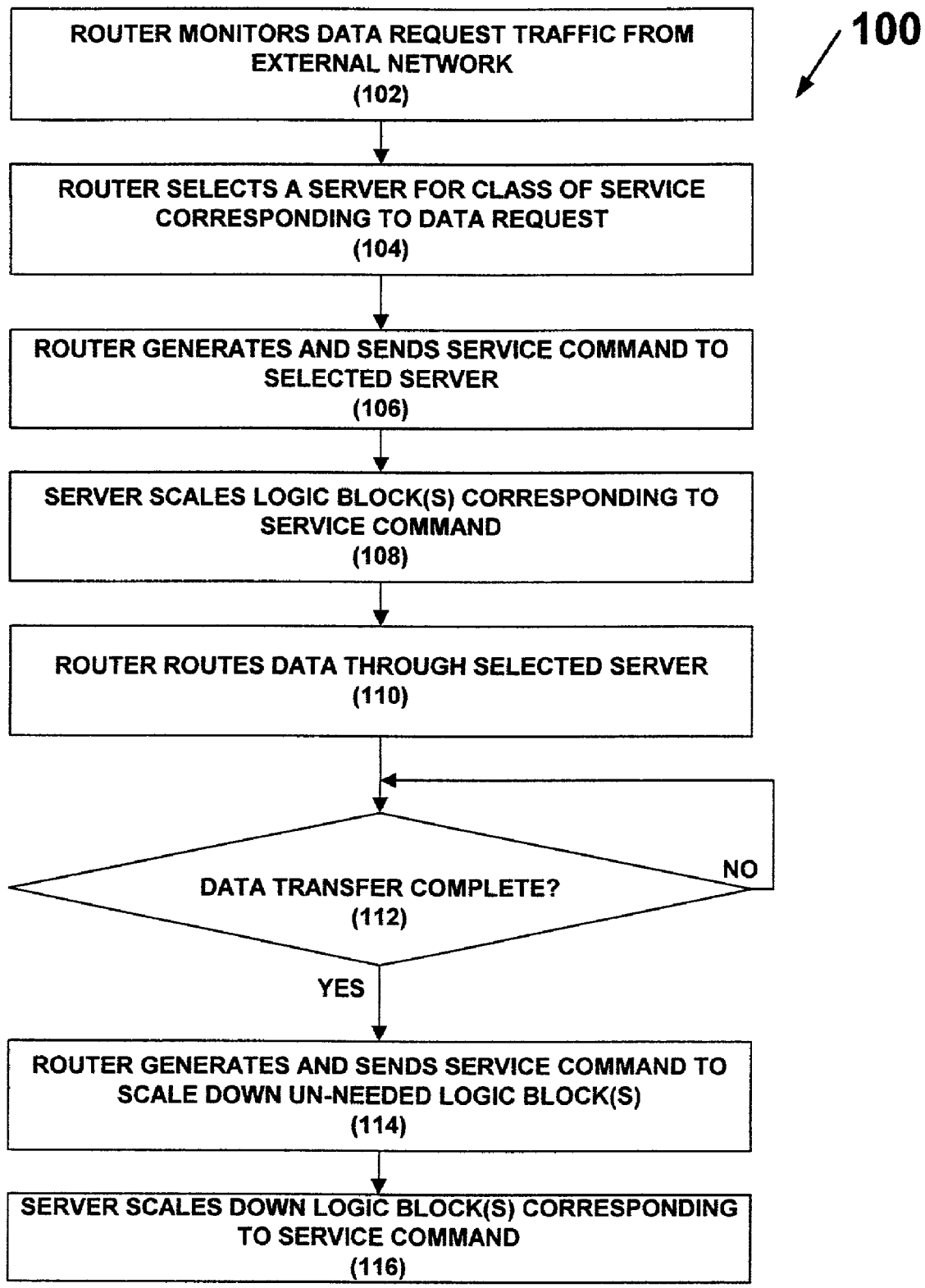
FIG. 2A is a flowchart showing a first embodiment of a process for responding to data requests.

Referring to FIG. 2A, a process 100 for scaling a logic block in a server computer included in a network 20 is shown. During performance of process 100 router 40 monitors (102) data requests from public network 30 addressed to data stored on a data devices 60a-60n within network 20. Router 40 selects (104) a server (the selected server) for processing a data transfer corresponding to the data request. Router 40 generates (106) and sends (106) a first service command to a selected server that indicates which scalable logic block to scale (up or down) in the selected server. The selected server scales (108) the specified logic block corresponding to the first service command. Router 40 routes (110) the data corresponding to the data request to and from the selected server. Router 40 determines (112) whether the data transfer has completed, and if the data transfer has completed, generates (114) and sends (114) a second service command to scale down a scalable logic block in the selected server that is no longer required for processing the data transfer. The selected server scales down (116) the specified logic block corresponding to the second service command.

In an embodiment of process 100, router 40 generates (106) a service command based on a class of service specified by a data request, for example, a class of service that corresponds to VOIP, streaming video, and/or encrypted data traffic.

Referring back to FIG. 1, in an embodiment of network 10, router 40 includes a server monitor logic block 44 that is used to receive acknowledgement messages from a server computer 50a-50n in network 20. Acknowledgement messages include information related to the status of scalable logic blocks included in a server, for example. Server monitor 44 is connected to service command generator 42. Server monitor 44 uses the received acknowledgement messages to determine if additional service commands should be generated and sent by service command generator 42 to a server to further scale a scalable logic block up or down, as will be explained.

Server monitor 44 may also monitor the response time of each server 50a-50n, and use the response time information to determine which one of the servers 50a-50n to select for responding to a new data request. This determination may also be based, in part, on a specified class of service corresponding to the data request, i.e., determining which server is best able to respond to the specified class of service.

Figure 2B:
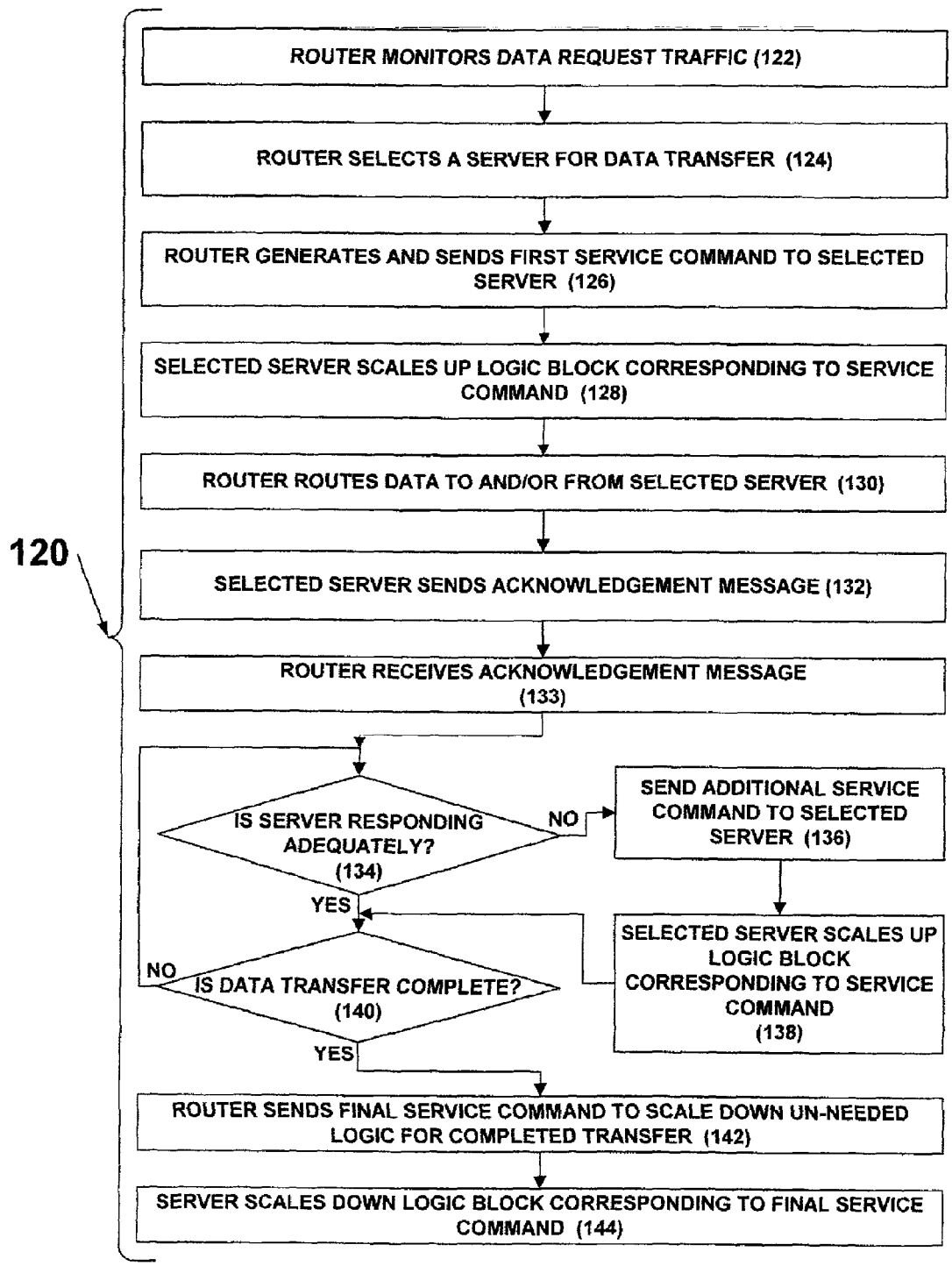
FIG. 2B is a flowchart showing a second embodiment of a process for responding to data requests.

Referring to FIG. 2B, a process 120 is shown for monitoring a server computer having scalable logic. Durign performance of process 120 router 40 monitors (122) data requests received and addressed to data stored on one of data devices 60a-60n. Router 40 selects (124) a server (the selected server) for processing a data transfer corresponding to the data request. Router 40 generates (126) and sends (126) a first service command that indicates which scalable logic block to scale (up or down) in the selected server. The selected server scales (128) the logic block corresponding to the first service command. Router 40 routes (130) the data corresponding to the data request to and/or from the selected server. The selected server sends (132) an acknowledgement message to server monitor 44. Router 40 receives (133) the acknowledgment message and determines (134) if selected server is responding adequately to the data request. If process 120 determines (134) that the selected server is not responding adequately, service command generator 42 generates (136) and sends (136) an additional service command to the selected server to scale up a specified logic block in selected server, and the selected server scales up (138) the specified logic block. Router 40 determines (140) if the data transfer has completed, and if it has not, process 120 repeats actions (134), (136), (138) and (140), until the data transfer has completed. When router 40 determines (140) the data transfer is complete, service command generator 42 generates (142) and sends (142) a final service command to scale down un-needed logic blocks on the selected server. The selected server scales down (144) those un-needed logic blocks specified by the final service command.

In an embodiment of process 120, router 40 generates (126) a service command based on a class of service specified by a data request, for example, a class of service that corresponds to VOIP, streaming video, and/or encrypted data traffic.

In an embodiment of network 10, a server, for example, server 50n scales a scalable logic block without receiving service commands from router 40. In more detail, referring again to FIG. 1, the service command interface 52 may be configured as a processor that determines which of the scalable logic blocks may be scaled up or down based on a received data request 65.

In an embodiment, service command interface logic block 52 is configured as an Ethernet adapter that receives service commands based on an Ethernet protocol. In this embodiment one or more of the scalable logic blocks may also be configured to receive commands based on an Ethernet protocol over internal bus 52a, therefore, interface 52 may forward received service commands directly to a scalable logic block without interpreting those received commands.

Data devices 60a-60n, included in network 20, may store many different types of data and applications (programs). For example data devices 60a-60n may store text files, image files and executable program files.

The processor of router 40 and the processors of each of the server computers 50a-50N in network 20 may be implemented in computer programs executing on programmable computers or other machines that each includes a storage medium readable by the processor. Each such program may be implemented in a high level procedural or object-oriented programming language to communicate with a computer system. However, the programs can be implemented in assembly or machine language. The language may be a compiled or an interpreted language.

Each computer program may be stored on an article of manufacture, such as a CD-ROM, hard disk, or magnetic diskette, that is readable by the processors in network 20 to process data packets in the manner described above. The processors may also be implemented as a machine-readable storage medium, configured with one or more computer programs, where, upon execution, instructions in the computer program(s) cause the processors to operate as described above.

Each computer program may be stored on an article of manufacture, such as a magnetic disk, that is readable by the processors to process data in the manner described above. The computer code may also be implemented as a machine-readable storage medium, configured with one or more computer programs.

The invention is not limited to the embodiments described above. For example, the invention is not limited to the specific hardware and software configurations described above. The invention is not limited to the protocols (e.g., encryption) described above. Furthermore, the service commands and acknowledgement messages may be transmitted between router 40 and servers 50a-50n over a bus other than shared data bus 48. For example, a dedicated command bus (not shown) may be included in private network 20 to connect router 40 with at least one of the servers 50a-50n and used to transmit service commands and acknowledgement messages. Also, router 40 may perform other functions than those described previously, for example, router 40 may also determine if a particular data request is from an authorized user (or authorized computer), or, may perform address translations, such as performing network address translations ("NAT", i.e., translating a public network address to a private network address, such as an Internet Protocol address). Other embodiments not described herein are also within the scope of the following claims.

What is claimed is:

1. An apparatus comprising:
a first processor to receive a data transfer request, and generate a service command that corresponds to and identifies a scalable logic block required to respond to the data transfer request, wherein the scalable logic block is selected from a choice of scalable logic blocks; and
a server computer having the scalable logic block, the server computer to receive the service command and scale the selected scalable logic block in accordance with the service command.

2. The apparatus of claim 1, wherein the first processor comprises a network interface that transfers the data transfer requests and data between the server computer and the network.

3. The apparatus of claim 2, wherein the data comprises packetized data corresponding to a class of service.

4. The apparatus of claim 2, wherein the first processor receives an informational signal before the data transfer request, wherein the received informational signal is used by the first processor to determine the service command generated.

5. The apparatus of claim 2, wherein the selected scalable logic block comprises at least one of a clock, an encryption logic block, and a processing unit.

6. The apparatus of claim 2, wherein the first processor monitors the performance of the server computer and generates a second service command based on the monitored performance of the server computer.

7. The apparatus of claim 2, further comprising:
at least two server computers connected to at least one common data device,
wherein the network interface selects one of the at least two server computers to transfer data corresponding to the data transfer request, and the service command is sent before the data transfer request is sent to the selected server.

8. The apparatus of claim 3, further comprising:
a command interface block to receive service commands and interpret the service commands based on an Ethernet protocol.

9. The apparatus of claim 5, wherein the scaling is based on a ratio of a speed of a bus.

10. The apparatus of claim 6, wherein the server computer generates an acknowledgement message, the received acknowledgement message being used by a router to determine the performance of the server computer.

11. An apparatus comprising:
a server computer having a choice of scalable logic blocks, the server computer to receive a data transfer request that identifies a scalable logic block to be selected from the choice of scalable logic blocks, and scale the identified scalable logic block in accordance with the data transfer request.

12. The apparatus of claim 11, wherein the data transfer request is transmitted over a network, and data corresponding to the data transfer request is transmitted over the network after the data transfer request is received by the server computer.

13. The apparatus of claim 12, wherein the data comprises packetized data corresponding to a class of service.

14. The apparatus of claim 12, wherein the server computer receives an informational signal before the data transfer request, wherein the server computer scales the identified scalable logic block based on the received informational signal.

15. The apparatus of claim 12, wherein the scalable logic block comprises at least one of a clock, an encryption logic block, and a processing unit.

16. An article comprising a machine-readable medium that stores executable instructions to process data, the instructions causing a machine to:
monitor data transfer requests at a first processor;
generate a first service command that corresponds to a scalable logic block selected from a choice of scalable logic blocks on a server computer, wherein the selected scalable logic block is required to respond to a received data transfer request; and
send the first service command to the server computer having the selected scalable logic block, wherein the server computer scales the scalable logic block in accordance with the service command.

17. The article of claim 16, wherein the first processor comprises a network interface, wherein the instructions cause the network interface to:
transfer the data transfer requests and data between the server computer and the network interface.

18. The article of claim 17, wherein the data comprises packetized data corresponding to a class of service.

19. The article of claim 17, further comprising instructions causing the first processor to:
monitor the performance of the server computer;
generate a second service command based on the monitored performance of the server computer; and
send the second service command to the server computer, wherein the server computer scales the selected scalable logic block in accordance with the second service command.

20. The article of claim 19, wherein the server computer generates and sends an acknowledgement message to the first processor, the received acknowledgement message being used by the first processor to determine the performance of the server computer.

21. An article comprising a machine-readable medium that stores executable instructions to process data received from a network, the instructions causing a machine to:
- select a scalable logic block from a choice of scalable logic blocks, wherein the selected scalable logic block is required to respond to a data transfer request received from the network; and
- scale the selected scalable logic block located on server computer in accordance with the data transfer request received from the network.

22. The article of claim 21, wherein data corresponding to the data transfer request is transmitted over the network after the data transfer request is received by the server computer.

23. The article of claim 22, wherein the data comprises packetized data corresponding to a class of service.

24. A method of processing data comprising:
- monitoring data transfer requests at a first processor;
- generating a service command that corresponds to a scalable logic block of a server computer, wherein the scalable logic block is selected from a choice of scalable logic blocks and required to respond to a received data transfer request; and
- sending the service command to the server computer having the selected scalable logic block, wherein the server computer scales the selected scalable logic block in accordance with the service command.

25. The method of claim 24, wherein the first processor comprises a network interface, the method further comprising:
- transferring the data transfer request and data corresponding to the data transfer request between the server computer and a network.

26. The method of claim 25, wherein the data comprises packetized data corresponding to a class of service.

27. The method of claim 26, wherein the scaling is based on a ratio of a speed of a bus.

28. The method of claim 26, further comprising:
- monitoring the performance of the server computer; and
- generating a second service command based on the monitored performance of the server computer.

29. A method comprising:
- generating a first service command to scale a scalable logic block of a computing system selected from a choice of scalable logic blocks in order to enable the computing system to respond to a data transfer request; and
- monitoring a performance of the computing system as the computing system responds to the data transfer request.

30. The method of claim 29, further comprising:
- generating a second service command based on the monitored performance.

31. The method of claim 29, further comprising:
- generating a second service command to further scale the scalable logic block.

32. The method of claim 29, further comprising:
- generating a second service command to scale another scalable logic block of the computing system.

33. A method comprising:
- generating a first service command to scale a scalable logic block of a computing system based on a data transfer request to be serviced, wherein the scalable logic block is selected from a choice of scalable logic blocks; and
- sending the first service command to the computing system prior to sending the data transfer request.

34. The method of claim 33, further comprising:
- monitoring a performance of the computing system as the computing system services the data transfer request.

35. The method of claim 34, further comprising:
- generating a second service command based on the monitored performance.

36. The method of claim 33, further comprising:
- generating a second service command to further scale the selected scalable logic block.

37. The method of claim 33, further comprising:
- generating a second service command to scale another scalable logic block of the computing system.

* * * * *